US010691094B1

(12) United States Patent
Yardley et al.

(10) Patent No.: US 10,691,094 B1
(45) Date of Patent: Jun. 23, 2020

(54) TECHNIQUES FOR INDICATING THE STATUS OF POWER DEVICES OF A POWER SUBSYSTEM

(71) Applicant: INTERNATIONAL BUSINESS MACHINES CORPORATION, Armonk, NY (US)

(72) Inventors: Brent W. Yardley, Hillsboro, OR (US); James M. Fox, Houston, TX (US); William Fast, Jr., Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 16/217,984

(22) Filed: Dec. 12, 2018

(51) Int. Cl.
  *G08B 21/00* (2006.01)
  *G05B 19/042* (2006.01)
  *G08B 21/18* (2006.01)
  *G08B 5/36* (2006.01)

(52) U.S. Cl.
  CPC ........... *G05B 19/0428* (2013.01); *G08B 5/36* (2013.01); *G08B 21/185* (2013.01); *G05B 2219/2639* (2013.01)

(58) Field of Classification Search
  CPC ......... H02J 7/00; G05B 19/0428; H02H 7/00; G06F 15/00
  USPC ........................ 340/635, 636.1, 636.19, 641
  See application file for complete search history.

(56) References Cited

U.S. PATENT DOCUMENTS

| 6,157,308 | A | * | 12/2000 | Byers | G01R 31/2632 324/512 |
|---|---|---|---|---|---|
| 6,574,577 | B2 | | 6/2003 | Stapleton et al. | |
| 7,178,044 | B2 | | 2/2007 | Pappalardo et al. | |
| 7,295,051 | B2 | | 11/2007 | Li et al. | |
| 7,320,086 | B2 | | 1/2008 | Majni et al. | |
| 9,429,630 | B2 | | 8/2016 | Zhu et al. | |
| 2015/0318027 | A1 | * | 11/2015 | Ellis | G01R 17/105 365/229 |
| 2018/0246169 | A1 | * | 8/2018 | Miura | B60L 3/0046 |

FOREIGN PATENT DOCUMENTS

WO    9965037 A1    12/1999

OTHER PUBLICATIONS

Hollstein et al., "Hinoc: A Hierarchical Generic Approach for on-Chip Communication, Testing and Debugging of SoCs", Springer, 2006.

* cited by examiner

*Primary Examiner* — Toan N Pham
(74) *Attorney, Agent, or Firm* — Michael R. Long; Wenjie Li

(57) ABSTRACT

A technique for operating a power subsystem includes determining a respective power status of power devices in the power subsystem. The power devices include a first power device and a second power device that derives power from the first power device. Respective visual indicators of the first and second power devices are controlled to uniquely indicate which of the first and second power devices have an associated fault based on the respective power status of the power devices.

20 Claims, 7 Drawing Sheets

US 10,691,094 B1

TECHNIQUES FOR INDICATING THE STATUS OF POWER DEVICES OF A POWER SUBSYSTEM

BACKGROUND OF THE INVENTION

This disclosure relates to power subsystems and, more specifically, to indicating the status of power devices of a power subsystem included in, for example, a data storage system.

A cascading failure in a system occurs when a failure of one or more components triggers the failure of one or more other components. A cascading failure may occur in various systems/subsystems, e.g., a power transmission system, a computer networking system, and a transportation system. As one specific example, a cascading failure may occur in an electronic system whose power subsystem utilizes cascaded power devices, where one or more power devices source power to one or more other power devices. In the case of a power subsystem that employs cascaded power devices it may not be readily evident as to which power devices in the power subsystem have actually failed, as upstream power device failure affects all downstream cascaded power devices.

BRIEF SUMMARY

A technique for operating a power subsystem includes determining a respective power status of power devices in the power subsystem. The power devices include a first power device and a second power device that derives power from the first power device. Respective visual indicators of the first and second power devices are controlled to uniquely indicate which of the first and second power devices have an associated fault based on the respective power status of the power devices.

The disclosed techniques may be implemented as a method, a system, and/or a program product (including program code stored in a storage device).

DETAILED DESCRIPTION

Figure 1:
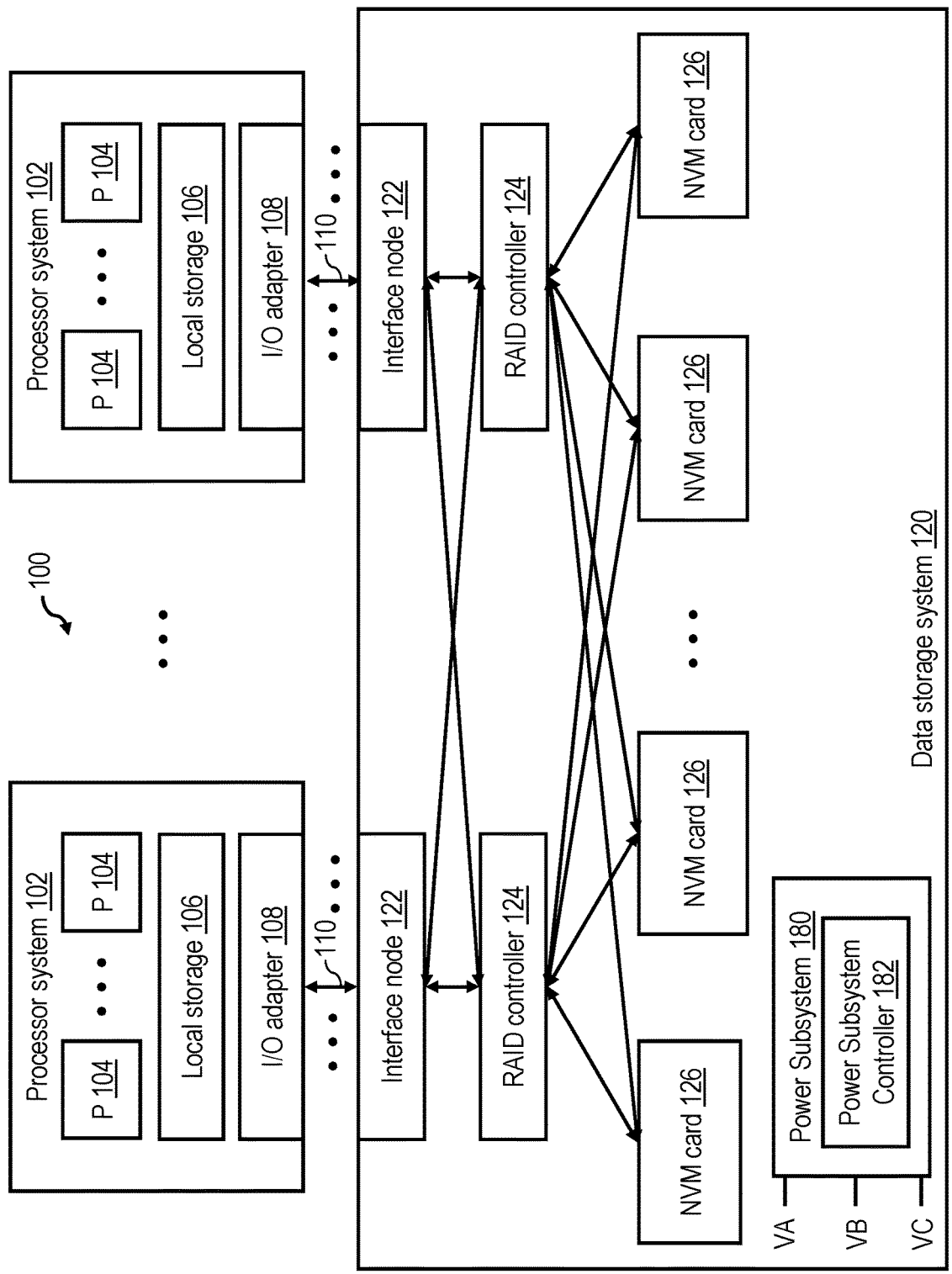
FIG. 1 is a high level block diagram of an exemplary data processing environment in accordance with one embodiment.

As system designs have increased in complexity, the number of power rails with different voltages required to implement the designs has typically increased. In general, increasing the number of power rails in a system design has led to increased debug time, increased initial start-up time, and increased validation time for the system design. Conventionally, debug and validation approaches for a system have employed silkscreen identification of power components and the inclusion of test-point groups that have required manual probing, which has required physical interaction with the system in order to debug and/or validate a design of the system. Unfortunately, debugging and/or validating a system design using manual probing can be time consuming, especially in cascaded power regulation architectures where an output provided by one power device (e.g., a DC-to-DC converter) may serve as an input to other power devices. Additionally, accurately debugging and validating a system design may require physical modification of the system design in order to draw accurate conclusions.

According to various embodiments of the present disclosure, visual indications are employed to accurately display a current state of power devices of a power subsystem. In general, visual indications can be used to quickly and accurately identify faults in power devices without the need for physical interaction with a power subsystem. Visually indicating a status of power devices within complex power subsystems can significantly reduce the amount of time required for debugging and/or validating the complex power subsystems and usually improves diagnostic accuracy due to process automation. For example, visual indicators may be co-located with power devices such that the visual indicators uniquely identify faulty power devices during a debug process.

According to one or more embodiments of the present disclosure, a power subsystem controller (e.g., a programmable logic device (PLD)) is implemented in conjunction with a separate visual indicator circuit (e.g., an LED circuit) or visual indicator for each power device included in a power subsystem. In various embodiments, the controller is configured to control (enable) individual power devices (via a respective enable signal) and monitor the power devices (via a respective bidirectional signal associated with each power device). Each visual indicator is designed to illuminate a respective LED under fault conditions to provide a visual indication of a fault. In various embodiments, a node in the visual indicator that provides an indication of a level of a power status output signal of a power device is also electrically connected to a respective input/output (I/O) pin of the controller as a bidirectional I/O. The bidirectional I/O connection allows the controller to monitor a power device and independently control an associated visual indicator of the power device. In one or more embodiments, logic in the controller only allows an LED to be illuminated under actual fault conditions. For example, assuming a signal level at the node in the visual indicator that provides an indication of the power status of the power device corresponds to the power not being good and the controller determines that the power device is not enabled the controller overrides the power status and prevents the LED from being illuminated to indicate a fault. In general, a power subsystem configured according to the present disclosure includes a power subsystem controller that has knowledge of enable sequencing of cascaded power devices such that false failure indications are avoided for power devices that are not enabled, as those associated visual indicator circuits are not enabled.

An additional benefit of connecting the node in the visual indicator that indicates a level of a power status output of a power device to the controller is that doing so allows the controller to control the LED of the visual indicator directly, which facilitates more detailed and varied visual indications (e.g., blinking the LEDs of faulted components and uniquely indicating other components affected during a fault condition). For instance, one blink pattern can be used to indicate the power device that caused a fault and the LEDs of other power devices affected by the fault can also be illuminated to help quickly display the impact of the fault on the system. The controller may also be configured to differentiate between different types of faults, e.g., faults occurring during power sequencing, faults occurring during runtime, and timeouts, for example, by using different blink patterns for the different faults. It should be appreciated that the listed faults are merely examples and that the controller may be configured to differentiate between additional faults.

In general, a technique for managing a power subsystem according to the present disclosure includes determining a respective power status of power devices in the power subsystem. The power devices include, for example, a first power device and any additional power devices that derive power from the first power device. Respective co-located visual indicators for each power device are controlled to uniquely indicate which of the power devices have an associated fault, as well as isolating an indicator for the faulting power device and suppressing indicators for power devices that derive power from the faulting power device.

With reference to the figures and with particular reference to FIG. 1, there is illustrated a high level block diagram of an exemplary data processing environment 100 that includes a data storage system 120 that includes a power subsystem configured according to the present disclosure. It should be appreciated that the data storage system is provided as an exemplary system that may include the disclosed power subsystem and that the disclosed power subsystem may be deployed in various other systems. As shown, data processing environment 100 includes one or more hosts, such as a processor system 102 having one or more processors 104 that process instructions and data. Processor system 102 may additionally include local storage 106 (e.g., Dynamic Random Access Memory (DRAM) or disks) that may store program code, operands and/or execution results of the processing performed by processor(s) 104. In various embodiments, processor system 102 can be, for example, a mobile calculating device (such as a smartphone or tablet), a laptop or desktop personal computer system, a server computer system (such as one of the POWER® series available from International Business Machines Corporation), or a mainframe computer system. Processor system 102 can also be an embedded processor system using various processors such as ARM®, POWER, Intel X86, or any other processor combined with memory caches, memory controllers, local storage, Input/Output (I/O) bus hubs, etc.

Each processor system 102 further includes an I/O adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), Non-volatile Memory Express (NVMe), NVMe over Fabrics, etc. I/O operations (IOPs) communicated via I/O channel 110 include read IOPs by which a processor system 102 requests data from data storage system 120 and write IOPs by which a processor system 102 requests storage of data in data storage system 120.

In the illustrated embodiment, data storage system 120 includes multiple interface nodes 122 through which data storage system 120 receives and responds to IOPs via I/O channels 110. Each interface node 122 is coupled to each of multiple outer Redundant Array of Independent Disks (RAID) controllers 124 in order to facilitate fault tolerance and load balancing. Each of outer RAID controllers 124 is in turn coupled (e.g., by a PCIe bus) to each of multiple NVM cards 126 including, in this example, NVM storage media. In other embodiments, other lossy storage media can be employed.

Data storage system 120 is depicted as including a power subsystem 180 that includes a power subsystem controller (e.g., a PLD) 182 and that supplies three different supply voltages VA, VB, and VC at least one of which is derived from another one of the supply voltages. For example, voltage VA may correspond to 5V, voltage VB may correspond to 3V, and voltage VC may correspond to 1.5V, where voltage VB is derived from voltage VA, and voltage VC is derived from voltage VA or voltage VB. It should be appreciated that a power subsystem configured according to the present disclosure may supply more or less than three different supply voltages.

Figure 2:
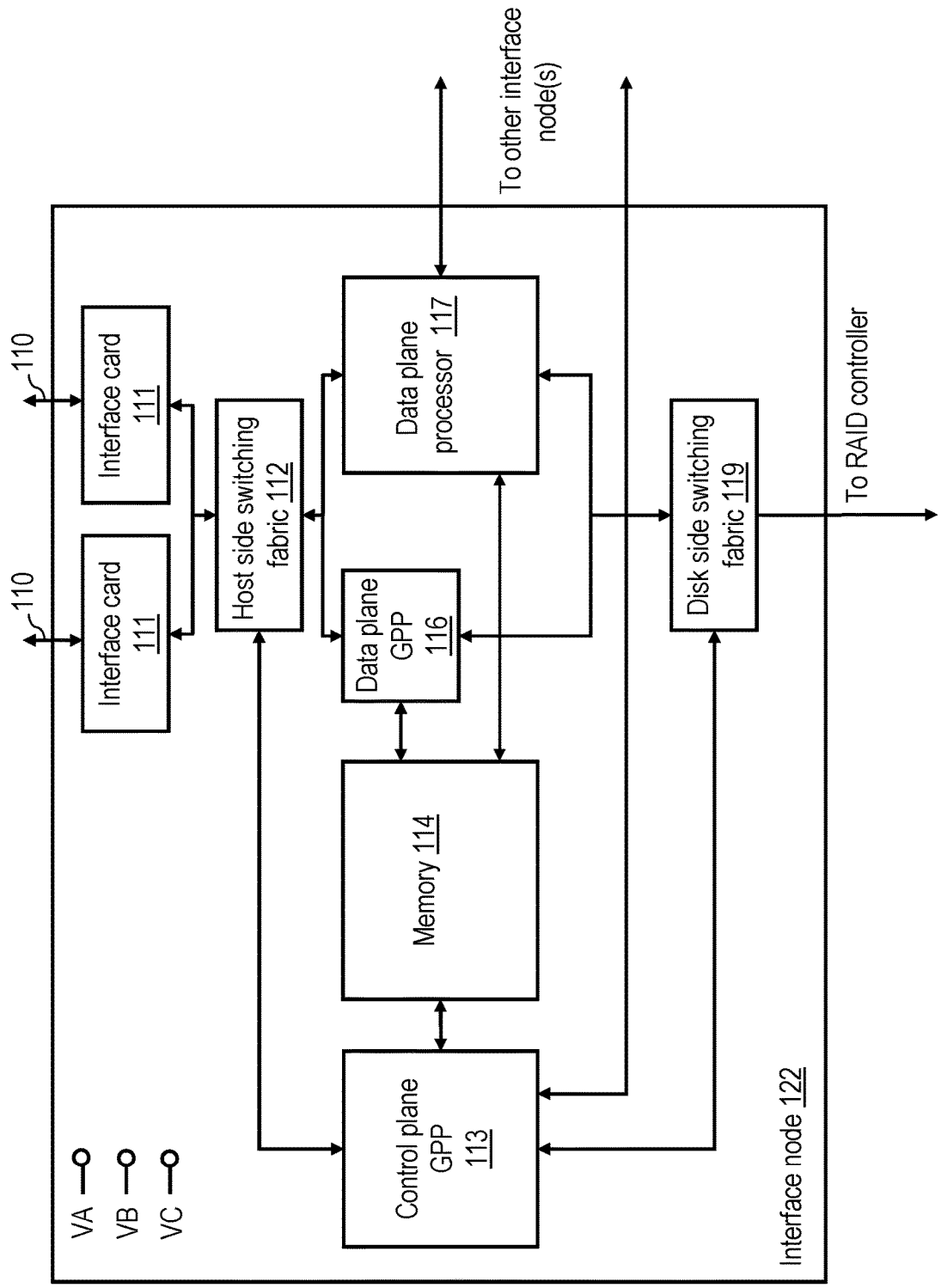
FIG. 2 is a more detailed block diagram of an exemplary interface node of the data storage system of FIG. 1.

FIG. 2 depicts a more detailed block diagram of an interface node 122 of data storage system 120 of FIG. 1. It should be appreciated that power subsystem 180 may provide one or more of voltages VA, VB, and VC to interface node 122. Interface node 122 includes one or more interface cards 111 that serve as an interface to processor systems 102 through I/O channels 110 and connect to host side switching fabric 112. The host side switching fabric 112 acts as a switch and handles all data transfers between interface cards 111 and processing units in interface node 122, namely control plane general purpose processor (GPP) 113, data plane GPP 116, and data plane processor 117. Typically, host side switching fabric 112 consist of a PCIe switch, but other switch technologies may be used as well. In one or more embodiments, data plane processor 117 is a special purpose processor that can be implemented, for example, by an Application Specific Integrated Circuit (ASIC) or a Field Programmable Gate Array (FPGA). Control plane GPP 113, data plane GPP 116, and data plane processor 117 are all connected to memory 114 which may be implemented as a shared memory between these components, separate memories, or a combination thereof.

In embodiments in which data plane processor 117 is implemented with an FPGA, control plane GPP 113 may program and configure data plane processor 117 during start-up of data storage system 120. Data plane GPP 116 and control plane GPP 113 control data plane processor 117 as well as access to NVM cards 126 either indirectly through the control of data plane processor 117 or directly through disk side switching fabric 119. Control plane GPP 113 executes system management functions as well as higher level services such as snapshots, thin provisioning, and deduplication. Data plane GPP 116 executes protocol specific functions. Control plane GPP 113, data plane GPP 116, and data plane processor 117 are connected to outer RAID controller 124 through disk side switching fabric 119 which typically consist of a PCIe switch, but other switch technologies may be used as well. FIG. 2 further illustrates control plane GPP 113 and data plane processor 117 being connected to other interface nodes 122 in data storage system 120 to handle fail-over scenarios or for performing other data synchronization functions.

Figure 3:
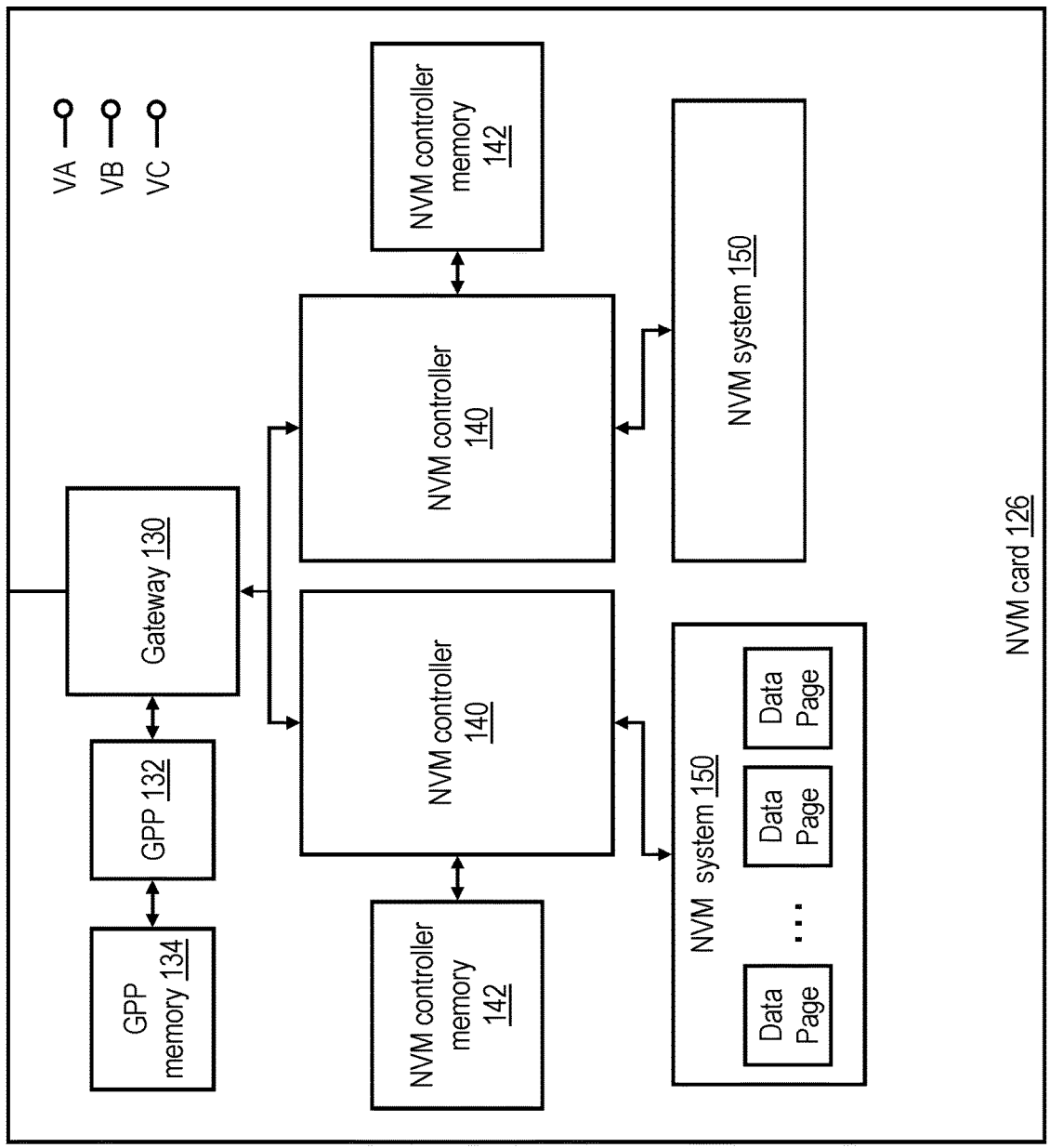
FIG. 3 is a more detailed block diagram of an exemplary non-volatile memory (NVM) card of the data storage system of FIG. 1.

FIG. 3 depicts a more detailed block diagram of an NVM card 126 of data storage system 120 of FIG. 1. It should be appreciated that power subsystem 180 may provide one or more of voltages VA, VB, and VC to NVM card 126. NVM card 126 includes a gateway 130 that serves as an interface between NVM card 126 and outer RAID controllers 124. Gateway 130 is coupled to a general-purpose processor (GPP) 132, which can be configured (e.g., by program code) to perform various management functions, such as pre-processing of IOPs received by gateway 130 and/or to schedule servicing of the IOPs by NVM card 126. GPP 132 is coupled to a GPP memory 134 (e.g., Dynamic Random Access Memory (DRAM) or Magneto-resistive Random Access Memory (MRAM)) that can conveniently buffer data created, referenced, and/or modified by GPP 132 in the course of its processing.

Gateway 130 is further coupled to multiple NVM controllers 140, each of which controls a respective NVM system 150. The NVM controllers 140 may implement combined ECC/RAID data protection techniques for a NVM array. NVM controllers 140 can be implemented, for example, by an Application Specific Integrated Circuit (ASIC) or a Field Programmable Gate Array (FPGA) having an associated NVM controller memory 142 (e.g., DRAM). In embodiments in which NVM controllers 140 are implemented with an FPGA, GPP 132 may program and configure NVM controllers 140 during start-up of data storage system 120.

Figure 4:
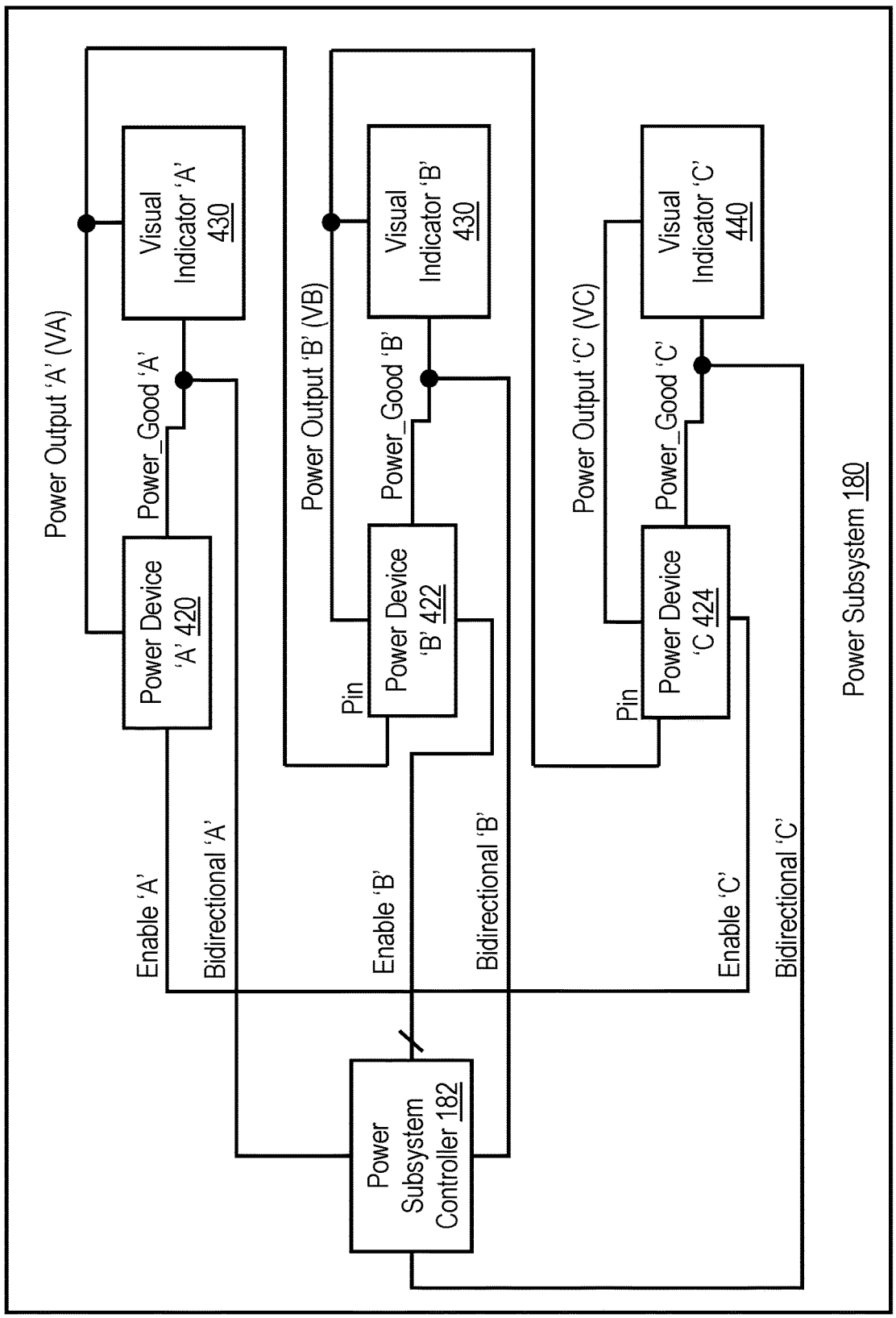
FIG. 4 is a diagram of an exemplary power subsystem configured according to an embodiment of the present disclosure.

With reference to FIG. 4 an exemplary power subsystem 180 is illustrated according to one embodiment of the present disclosure. As is illustrated, power subsystem 180 includes power subsystem controller 182, three different power devices (e.g., DC-to-DC converters that each provide a different voltage level) 420, 422, and 424, two indicator circuits 430, and one indicator circuit 440. Power subsystem controller 182 provides separate enable signals to each power device 420, 422, and 424 and monitors Power_Good (power status) signals associated with each power device 420, 422, and 424 via respective bidirectional signal lines. As illustrated, voltages VB and VC are both derived from voltage VA, with voltage VC also being derived from voltage VB. It should be appreciated that a power subsystem configured according to the present disclosure may include more or less than three power devices and more or less than two different types of indicator circuits.

Figure 5:
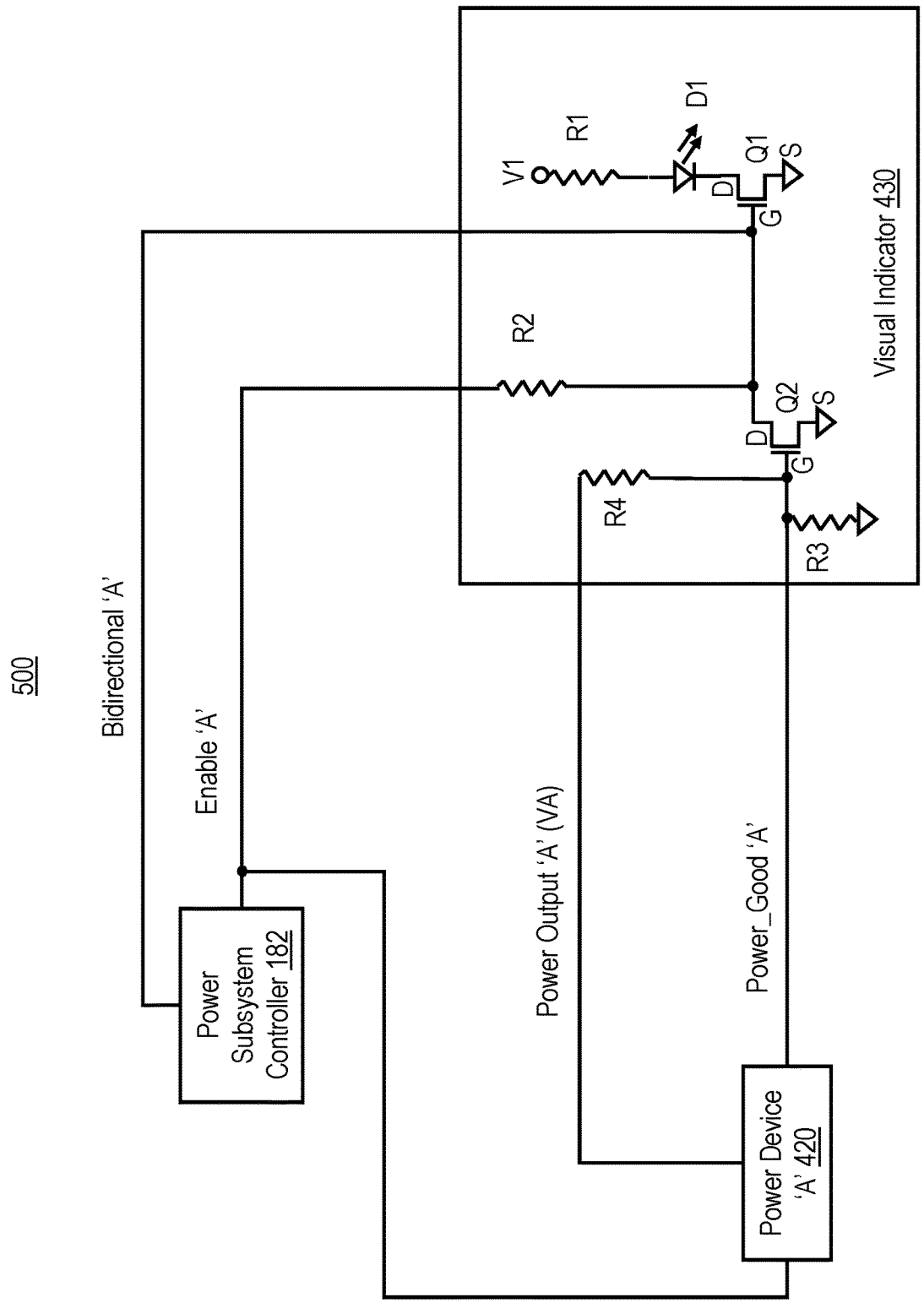
FIG. 5 is a diagram of an exemplary visual indicator circuit for a power subsystem configured according to an embodiment of the present disclosure.

With reference to FIG. 5 a circuit 500 is illustrated according to one embodiment of the present disclosure. As is illustrated, visual indicator 430 includes n-channel enhancement mode Field-Effect Transistors (FETs) Q1 and Q2, resistors R1, R2, R3, and R4, and Light-Emitting Diode (LED) D1. A gate of FET Q2 is coupled to a power status output (that provides a Power_Good 'A' signal that when power is good is in a high impedance state and when power is not good is in an asserted low state) of power device 420. Sources of FETs Q2 and Q1 are coupled to ground. A drain of FET Q2 is coupled to a gate of FET Q1. A drain of FET Q1 is coupled to a first terminal of LED D1. A second terminal of LED D1 is coupled to a first terminal of resistor R1. A second terminal of resistor R1 is coupled to a voltage source V1 (e.g., voltage VA, voltage VB, or voltage VC).

In various embodiments, the power status output of power device 420 is an open drain output. The Power_Good 'A' signal is pulled up through resistor R4 to a power output signal level of power device 420 and is pulled down through resistor R3 to ground. The pull-up/pull-down arrangement of resistors R4 and R3 ensures FET Q2 only turns on when the Power_Good 'A' signal indicates that power is good (i.e., the Power_Good 'A' signal line is in a high impedance state) and an output voltage is present at a power output of power device 420. In the event that a level of an output voltage of power device 420 is not sufficient to provide a voltage at the gate of FET Q2 that exceeds a gate-to-source voltage threshold ($Vgs_{th}$) of FET Q2, FET Q2 can be replaced with a comparator that uses an external reference voltage.

A signal at the drain of FET Q2 and the gate of FET Q1 provides a power status indication to controller 182 and also controls (unless overridden by controller 182) whether FET Q1 is turned on and LED D1 is illuminated. The signal at the drain of FET Q2 and the gate of FET Q1 is pulled-up through resistor R2 to an Enable 'A' signal output provided by controller 182 for power device 420. Alternatively, the drain of FET Q2 and the gate of FET Q1 may be pulled-up to a constant voltage (see FIG. 6). When the gate of FET Q1 is pulled-up to a constant voltage and resistor R2 is not implemented, controller 182 is configured such that controller 182 does not drive an output signal on the bidirectional signal line while power device 420 is enabled. Implementing resistor R2 prevents false Power_Good signal indications under a variety of conditions, simplifies the logic of controller 182, and ensures controller 182 only detects a Power_Good 'A' signal when power device 420 is actually enabled.

Illumination of LED D1 is controlled by FET Q1 and the current through LED D1 is limited by resistor R1. FET Q1 is turned on when a voltage at the gate of FET Q1 exceeds its gate-to-source voltage threshold ($Vgs_{th}$), i.e., when FET Q2 is turned off as the gate of FET Q1 is pulled up to an Enable 'A' signal output through resistor R2 when the Enable 'A' signal is asserted high. FET Q1 is turned off when FET Q2 is turned on unless controller 182 provides an output signal through the Bidirectional 'A' signal that controls FET Q1. When FET Q2 is enabled, FET Q1 is not overridden in this way due to FET Q2 being connected directly to ground. It should be appreciated that visual indicator 430 may be readily modified to allow for different voltage levels at various points, different resistance values to cover various design voltages, different drive states of power status outputs, and inverse assertion states of all signals.

Figure 6:
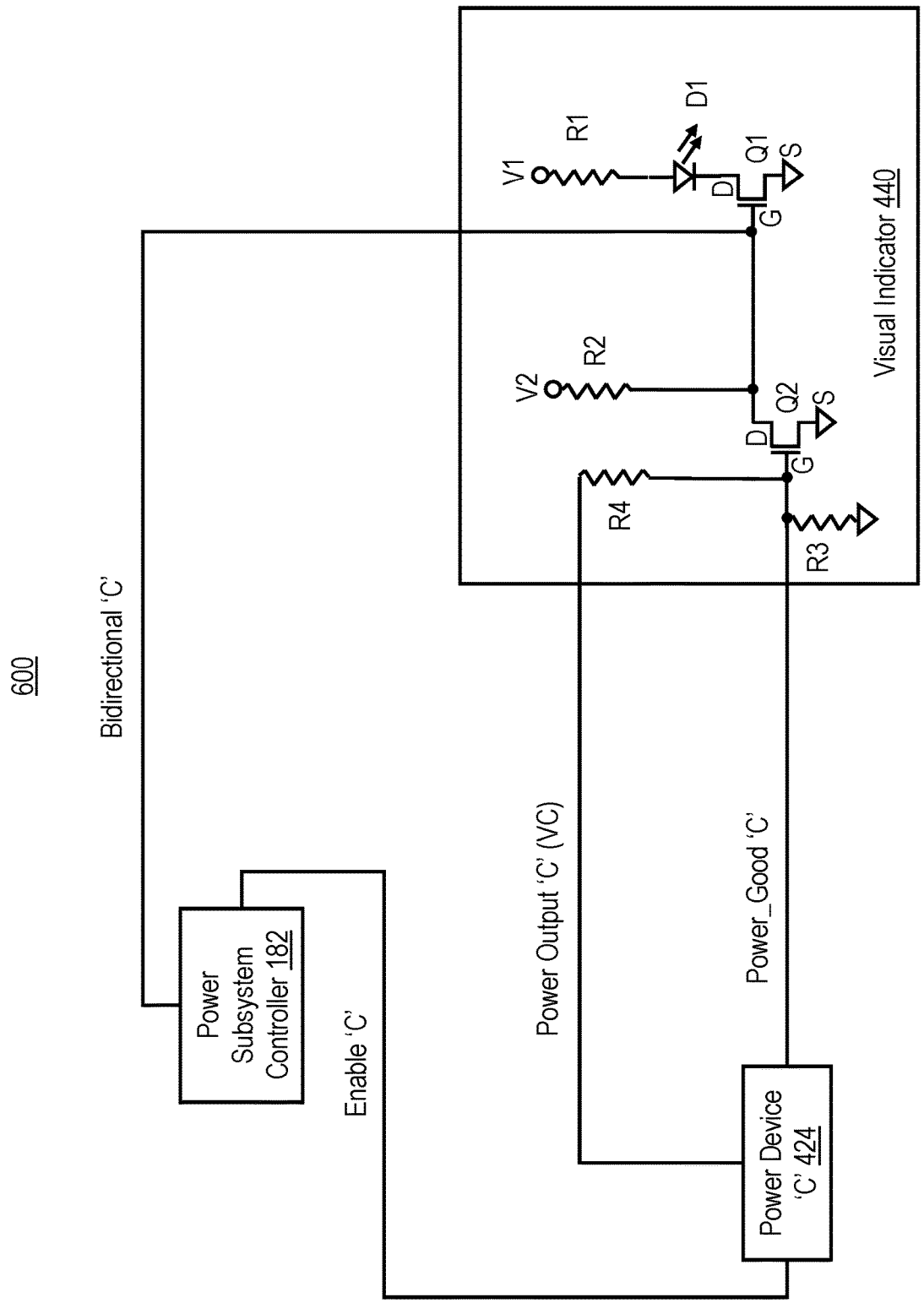
FIG. 6 is a diagram of an exemplary visual indicator circuit for a power subsystem configured according to another embodiment of the present disclosure.

With reference to FIG. 6 a circuit 600 is illustrated according to another embodiment of the present disclosure. As is illustrated, visual indicator 440 includes n-channel enhancement mode FETs Q1 and Q2, resistors R1, R2, R3, and R4, and LED D1. A gate of FET Q2 is coupled to a power status output (that provides a Power_Good 'C' signal that when power is good is in a high impedance state and when power is not good is in an asserted low state) of power device 424. Sources of FETs Q2 and Q1 are coupled to ground. A drain of FET Q2 is coupled to a gate of FET Q1. A drain of FET Q1 is coupled to a first terminal of LED D1. A second terminal of LED D1 is coupled to a first terminal of resistor R1. A second terminal of resistor R1 is coupled to a voltage source V1.

In various embodiments, the power status output of power device 424 is an open drain output. The Power_Good 'C' signal is pulled up through resistor R4 to a power output signal level of power device 424 and is pulled down through resistor R3 to ground. The pull-up/pull-down arrangement of resistors R4 and R3 ensures that FET Q2 only turns on when the Power_Good 'C' signal indicates that power is good (i.e., the Power_Good 'C' signal line is in a high impedance state) and an output voltage is present at a power output of power device 424. In the event that a level of an output voltage of power device 424 is not sufficient to provide a voltage at the gate of FET Q2 that exceeds a gate-to-source voltage threshold ($Vgs_{th}$) of FET Q2, FET Q2 can be replaced with a comparator that uses an external reference voltage.

A signal at the drain of FET Q2 and the gate of FET Q1 provides a power status indication to controller 182 and also controls (unless overridden by controller 182) whether LED D1 is illuminated. The signal at the drain of FET Q2 and the gate of FET Q1 is pulled-up to a constant voltage V2 via resistor R2. Resistor R2 is used to limit current sourced from voltage V2 when FET Q2 is enabled, as FET Q2 connects the circuit to ground when FET Q2 is turned on. When the gate of FET Q1 is pulled-up to constant voltage V2 through resistor R2, controller 182 is configured such that controller 182 does not drive an output signal on the bidirectional signal line while power device 424 is enabled. Illumination of LED D1 is controlled by FET Q1 and current through LED D1 is limited by resistor R1. FET Q1 is turned on when a voltage at the gate of FET Q1 exceeds its gate-to-source voltage threshold ($Vgs_{th}$), i.e., when FET Q2 is turned off as the gate of FET Q1 is pulled up to constant voltage V2 through resistor R2. FET Q1 is turned off when FET Q2 is turned on unless controller 182 provides an output signal through the Bidirectional 'C' signal that controls FET Q1. When FET Q2 is enabled, FET Q1 is not overridden in this way due to FET Q2 being connected directly to ground. It should be appreciated that visual indicator 440 may be readily modified to allow for different voltage levels at various points, different resistance values to cover various design voltages, different drive states of power status outputs, and inverse assertion states of all signals.

Figure 7:
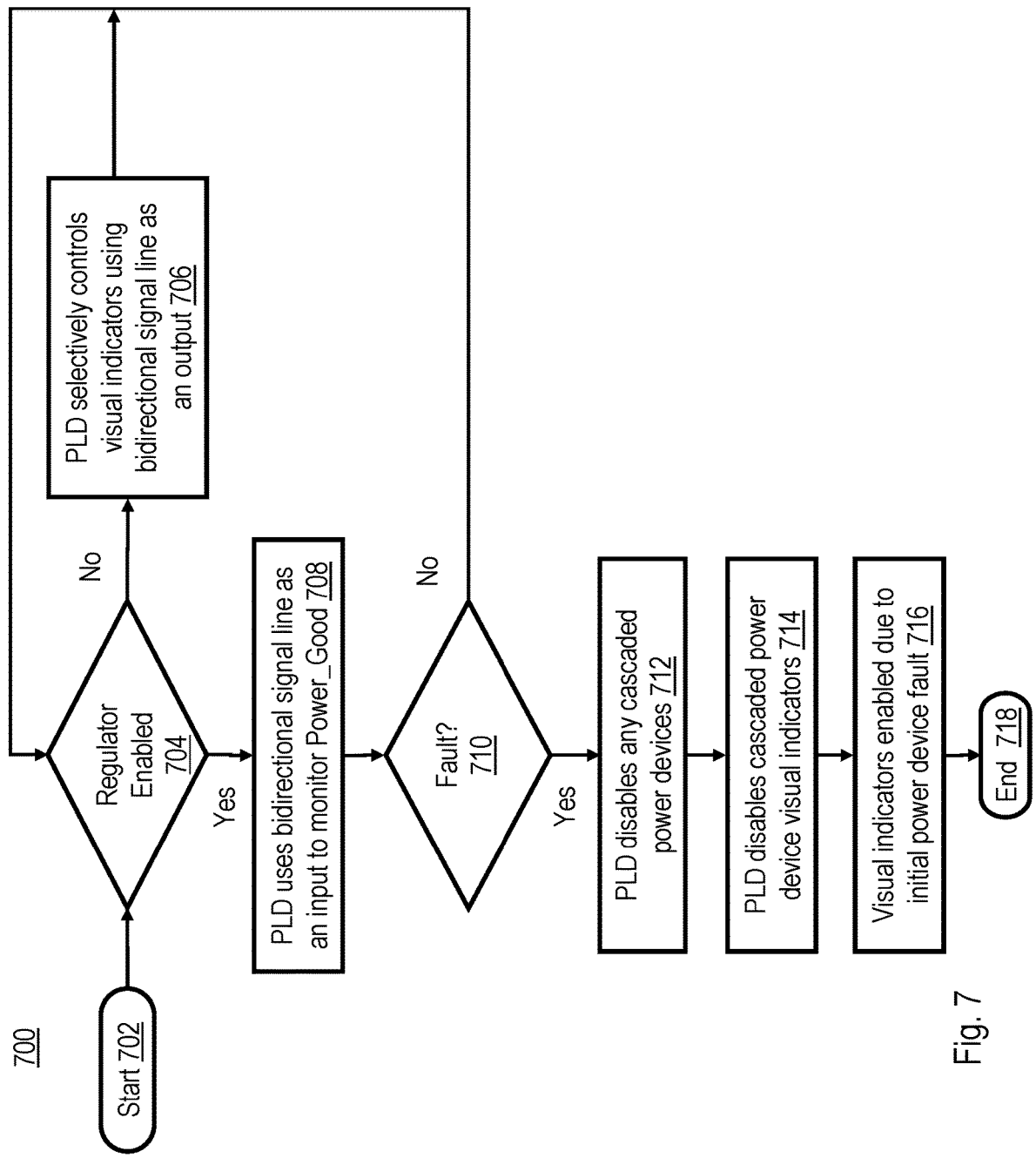
FIG. 7 is a high level logical flowchart of an exemplary process for operating a power subsystem in accordance with an embodiment of the present disclosure.

With reference to FIG. 7, an exemplary process 700 is illustrated that is used to control visual indicators of power subsystem 180 to uniquely indicate power device (e.g., one or more of power devices 420, 422, and 424) faults. Process 700 is performed by controller 182 (which may, for example, take the form of a PLD) that is, for example, included in data storage system 120. Process 700 may be periodically initiated in block 702 while controller 182 is powered up and may be executed in parallel for each power device. Alternatively or in addition to, controller 182 may be configured to determine a state of power subsystem 180 in response to a query received via a communication bus (e.g., coupled to interface node 122). Next, in decision block 704, controller 182 determines whether a power device (regulator) is enabled. In response to a power device (e.g., one or more of power devices 420, 422, and 424) not being enabled control transfers from block 704 to block 706, where controller 182 selectively controls (e.g., disables) an indicator associated with the power device, via an associated bidirectional signal line. From block 706 control returns to block 704. In response to a power device being enabled in block 704 control transfers to block 708. In block 708 controller 182 utilizes the bidirectional signal line as an input to monitor the Power_Good signal. From block 708 control transfers to block 710.

In block 710, controller 182 determines whether a fault has occurred (via respective bidirectional signal line connections) in data storage system 120. In response to controller 182 determining a fault has not occurred in power subsystem 180 control transfers from block 710 to block 704. In response to controller 182 determining a fault has occurred in power subsystem 180 control transfers from block 710 to block 712. In block 712, controller 182 disables cascaded power devices (regulators) from the faulting power device (regulator). For example, assuming power device 422 derives power from power device 420, power device 424 derives power from power device 422, and power device 422 has a fault then power device 424 is disabled. Next, in block 714 indicators for the cascaded power devices that have been disabled are also disabled. Then, in block 716, controller 182 controls the visual indicators for the power devices to uniquely indicate associated faults. As noted above, different visual patterns may be employed to indicate when a fault occurred, e.g., whether a fault occurred during power sequencing or runtime, or whether a timeout occurred. Following block 716 control transfers to block 718, where process 700 terminates and control returns to a calling routine.

Advantageously, the disclosed techniques generally decrease debug time, decrease initial start-up time, and decrease validation time for a system design that implements cascaded power regulation architectures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a NVM controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transmission media per se, transitory propagating signals per se, and forms of energy per se.

In addition, although embodiments have been described that include use of an NVM such as a phase change memory (PCM), it should be appreciated that embodiments of the present invention can also be used with other types of non-volatile random access memory (NVRAM) including, for example, flash memory, as well as traditional rotational hard drives (HDDs), shingled magnetic recording hard disk drives (SMR HDDs) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of operating a power subsystem, comprising:
   determining, by a controller, a respective power status of power devices in the power subsystem, wherein the power devices include a first power device and a second power device that derives power from the first power device; and controlling, by the controller, respective visual indicators of the first and second power devices to uniquely indicate which of the first and second power devices have an associated fault based on the respective power status of the power devices.

2. The method of claim 1, wherein the controller is a programmable logic device (PLD).

3. The method of claim 1, wherein the first and second power devices are DC-to-DC converters.

4. The method of claim 1, wherein each of the visual indicators includes a respective light-emitting diode (LED) circuit.

5. The method of claim 1, further comprising:
determining, by the controller, whether the fault occurs during power sequencing; and
in response to determining the fault occurred during power sequencing, controlling, by the controller, the visual indicators to indicate the fault occurred during power sequencing, wherein the controller is configured to selectively disable the power devices and the visual indicators.

6. The method of claim 1, further comprising:
determining, by the controller, whether the fault occurs during runtime; and
in response to determining the fault occurred during runtime, controlling, by the controller, the visual indicators to indicate the fault occurred during runtime, wherein the controller is configured to selectively disable the power devices and the visual indicators.

7. The method of claim 1, wherein the controller is further configured to determine a state of the power subsystem in response to a query received via a communication bus.

8. A power subsystem, comprising:
a first power device including a first power status output and a first power output;
a second power device including a second power status output and a second power output, wherein the second power device derives power from the first power device;
a first visual indicator coupled to the first power status output and the first power output;
a second visual indicator coupled to the second power status output and the second power output; and
a controller coupled to the first and second visual indicators, wherein the controller is configured to selectively generate a first enable signal for the first power device and a second enable signal for the second power device, and wherein the controller is configured to monitor the first and second power status outputs via the first and second visual indicators and control the first and second visual indicators to uniquely indicate which of the first and second power devices have an associated fault based on a state of the first and second enable signals.

9. The power subsystem of claim 8, wherein the controller is a programmable logic device (PLD).

10. The power subsystem of claim 8, wherein the first and second power devices are DC-to-DC converters.

11. The power subsystem of claim 8, wherein each of the visual indicators includes a respective light-emitting diode (LED) circuit.

12. The power subsystem of claim 8, wherein the controller is further configured to determine whether the fault occurred during power sequencing and in response to determining the fault occurred during power sequencing control the visual indicators to uniquely indicate the fault occurred during power sequencing, and wherein the controller is further configured to selectively disable the power devices and the visual indicators.

13. The power subsystem of claim 8, wherein the controller is further configured to determine whether the fault occurred during runtime and in response to determining the fault occurred during runtime control the visual indicators to uniquely indicate the fault occurred during runtime, and wherein the controller is further configured to selectively disable the power devices and the visual indicators.

14. The power subsystem of claim 8, wherein the controller is further configured to determine whether the fault occurred as a result of a timeout and in response to determining the fault occurred as a result of the timeout, control the visual indicators to indicate the fault occurred as a result of the timeout, and wherein the controller is further configured to selectively disable the power devices and the visual indicators.

15. A data storage system, comprising:
a first power device including a first power status output and a first power output;
a second power device including a second power status output and a second power output, wherein the second power device derives power from the first power device;
a first visual indicator coupled to the first power status output and the first power output;
a second visual indicator coupled to the second power status output and the second power output;
a controller coupled to the first and second visual indicators, wherein the controller is configured to selectively generate a first enable signal for the first power device and a second enable signal for the second power device, wherein the controller is configured to monitor the first and second power status outputs via the first and second visual indicators and control the first and second visual indicators to uniquely indicate which of the first and second power devices have an associated fault based on a state of the first and second enable signals; and
a nonvolatile memory (NVM) card coupled to at least one of the first and second power devices.

16. The data storage system of claim 15, wherein the controller is a programmable logic device (PLD).

17. The data storage system of claim 15, wherein the first and second power devices are DC-to-DC converters.

18. The data storage system of claim 15, wherein each of the visual indicators includes a respective light-emitting diode (LED) circuit.

19. The data storage system of claim 15, wherein the controller is further configured to determine whether the fault occurred during power sequencing and in response to determining the fault occurred during power sequencing control the visual indicators to uniquely indicate the fault occurred during power sequencing, and wherein the controller is further configured to selectively disable the power devices and the visual indicators.

20. The data storage system of claim 15, wherein the controller is further configured to determine whether the fault occurred during runtime and in response to determining the fault occurred during runtime control the visual indicators to uniquely indicate the fault occurred during runtime, and wherein the controller is further configured to determine whether the fault occurred as a result of a timeout and in response to determining the fault occurred as a result of the timeout, control the visual indicators to indicate the fault occurred as a result of the timeout, where the controller is further configured to selectively disable the power devices and the visual indicators.

* * * * *